Figure 1:
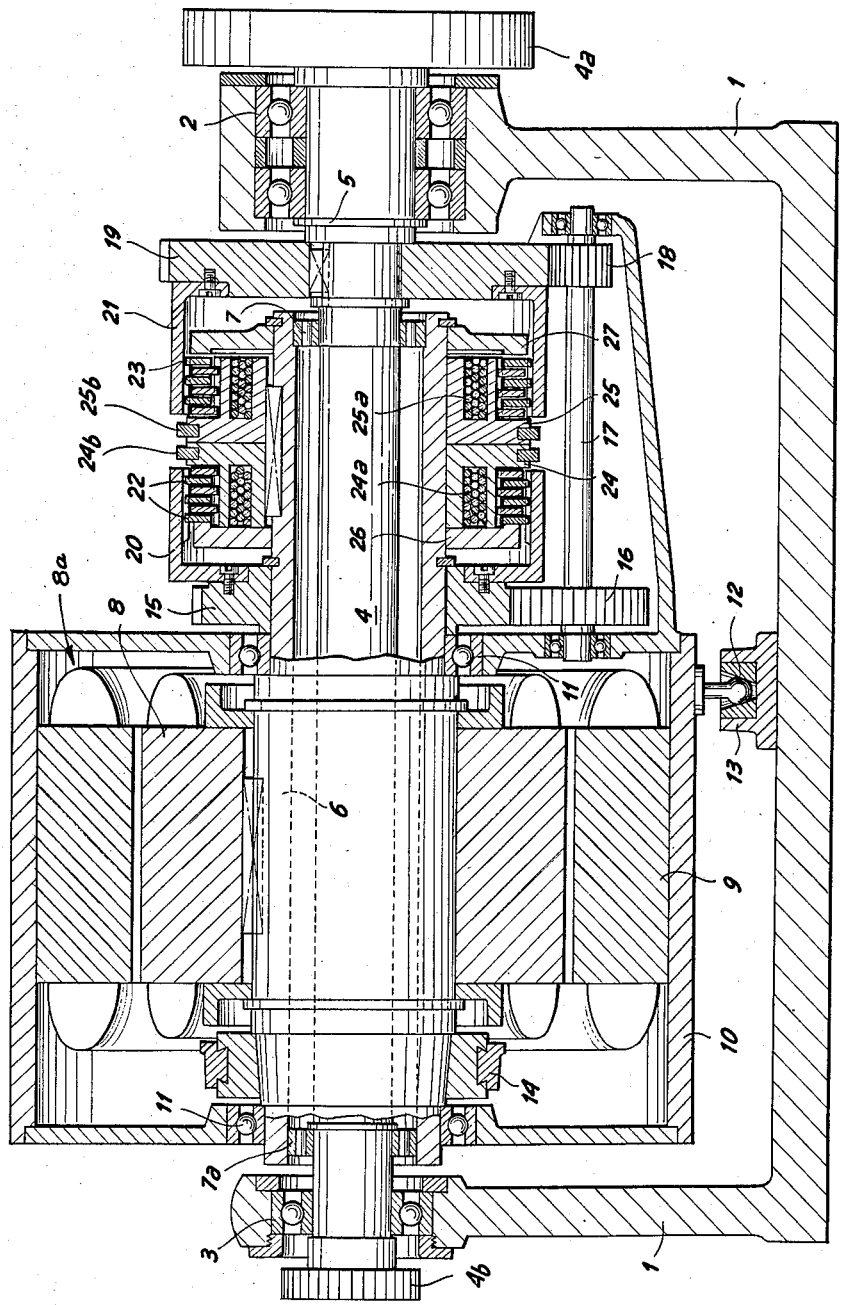

Jan. 5, 1960 L. PATRIGNANI ET AL 2,919,594
VARIABLE SPEED AND CONSTANT POWER CHUCK FOR
LATHES AND OTHER MACHINE TOOLS
Filed Feb. 10, 1956 2 Sheets-Sheet 1

INVENTORS:
LEONIDA PATRIGNANI
ETTORE BURALLI
By
Richardson, David and Nordon
ATTYS.

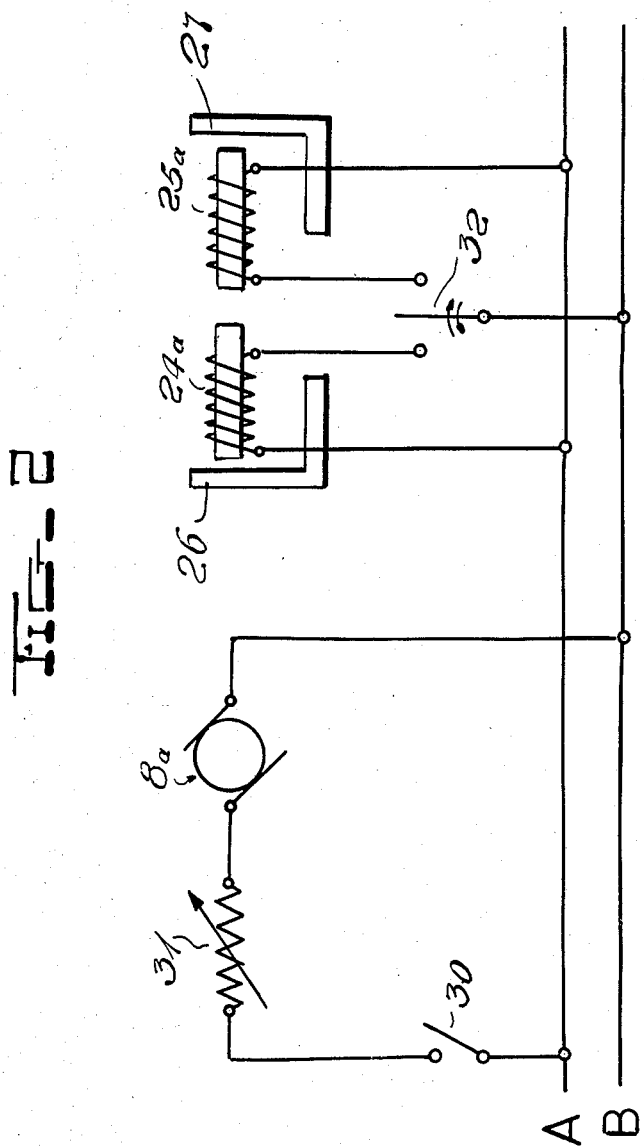

United States Patent Office 2,919,594
Patented Jan. 5, 1960

2,919,594

VARIABLE SPEED AND CONSTANT POWER CHUCK FOR LATHES AND OTHER MACHINE TOOLS

Leonida Patrignani and Ettore Buralli, Florence, Italy

Application February 10, 1956, Serial No. 564,804

Claims priority, application Italy February 18, 1955

6 Claims. (Cl. 74—365)

The object of the present invention is a chuck for machine tools, through which the failures and complications of the presently used chucks are eliminated, and also obtaining a greater working capacity. A chuck of this kind may be applied to all those machine tools provided with chip removal tools or with abrasive tools and said chuck is designed to rotate the workpiece with the stationary tools, or rotate the tools with respect to the workpiece.

In every case the machines of this kind must be actuated in order to confer to the chuck a variable rotational speed within wide ranges in relation to the diameter and to the material of the workpiece. The variation of the speed is usually obtained by interposing a gearbox system or a gradual speed regulator between the motor and the chuck, or by providing for the use of direct current motors provided with an electronic control of the speed.

The invention relates to a chuck which has the advantage of an extremely simple construction and which in addition solves the problem by obtaining variations of speed with torques which are inversely proportional to said speeds and according to a law, near the ideal law at least in the range of the practically used speeds.

A chuck according to the invention substantially includes a variable speed constant power electric motor which is coaxial to said chuck and means to determine a connection drive, which is direct or actuated through at least a suitable reduction gearing, between the motor and the chuck. The arrangement and the dimensions are such that the range of the chuck speeds required is covered by modifying the speed of the motor in the direct coupling conditions and in the coupling conditions through one or each of the modifications of the drive ratio between the motor and the chuck.

In the embodiment shown, there is provided a rotor for the electric motor carried by a hollow shaft sleeved on the chuck shaft. By arranging a motor, wherein it is possible to obtain a maximum speed which is triple that of the lowest speed (for instance from 1000 to 3000 r.p.m.), a single reduction drive ratio, besides the direct coupling, may be provided.

A clutch coaxial to the chuck and thus to the motor may be actuated in such a way as to be also controllable when the motor is operating; for instance, there may be provided a magnetic type friction clutch, which may be controlled and operated through suitable contact shoes. In every case, a clutch operable during the rotation allows the motor to regain in an automatic way the highest rotational speed passing from a drive ratio to a reduced one and thus allowing a continuous variation of the chuck speed.

A chuck of this kind may be made in a remarkably reduced size, owing to the coaxial arrangement of the motor relative to the chuck and owing to the arrangement also coaxial to the chuck, which may be obtained for the drive apparatus.

The invention will be better appreciated by following the description and the accompanying drawings, which shows an embodiment of said invention.

In the drawings:

Fig. 1 shows a partially diagrammatic longitudinal section of a chuck embodying the invention, and Fig. 2 is an electrical diagram illustrating certain electrical control means forming a part of the invention.

According to the shown drawing, 1 denotes a base or support block to be combined with the machine tool or forming a part of said machine. 2 and 3 $6$ denote bearings—ball bearings in the embodiment—which support the chuck shaft 4. This shaft at one of its ends is provided with a head 4a for the application of the workpiece or a tool, and at the other end, may be provided with a gear 4b and another drive member for the transmission of motion designed for other members of the machine, for instance designed for transmitting motion to the toolholder slide of a lathe or to the feed or advance motion of any machine tool. A suitable collar 5 may assure the axial position of the chuck's shaft 4.

A tubular shaft 6, mounted on bearings 7, 7a directly carried by the shaft 4, is assembled on the shaft 4 in a position located between the bearings 2 and the bearing 3. The rotor 8 of an electric motor 8a, for instance, a direct current and variable speed one, is mounted on the tubular shaft 6, and the stator 9 of said motor is mounted in a casing or box 10 supported on the shaft 6 through the bearings 11; said casing 10 is prevented from rotating through a link, for instance, formed by a stop 12 on casing 10 retained in a suitable housing 13 fixed to the structure 1. The feed commutator of the motor is diagrammatically illustrated by numeral 14. A switch 30 and a variable resistance 31 are provided for controlling the operation and speed of the motor 8a, the lines "A" and "B" designating a source of direct current electrical energy.

In the drawing, there is provided a two drive ratios clutch designed for a direct connection and for a reduction drive between the motor and the chuck's shaft 4.

A gear wheel 15 is freely mounted on the hollow shaft 6, and said gear 15, through the gear 16, the transmission shaft 17 and a gear 18, transmits the motion to a gear 19 splined on the shaft 4 of the chuck. In the embodiment, there may be provided also several units such as 16, 17, 18. Two tubular elements 20, 21 are fixed respectively to the gears 15 and 19, friction rings discs or plates 22, 23 being rotarily fixed to said tubular elements and said rings discs or plates co-operating with other friction rings included between the rings 22, 23 and rotarily fixed to the two cores 24, 25 splined on the tubular shaft 6; said cores 24, 25 carry the windings 24a, 25a respectively for the attraction of the plates 26, 27 respectively of the magnetic clutches, said windings being fed by brushes connected with the commutators 24b, 25b respectively.

The energization of the electro-magnetic winding 24a and thus the attraction of the plate 26 determines the rotary coupling between the shaft 6 and the gear 15 through the clamping of the friction rings discs or plates 22; consequently the transmission of the motion of the shaft 6 to the shaft 4 takes place through the reduction 15, 16, 18, 19. The energization of the electro-magnetic winding 25a on the contrary determines the rotary motion through the rings, discs or plates 23 between the shaft 6 and the gear 19, so as to obtain a direct transmission from the rotor to the chuck. Selective energization of the windings 24a and 25a is, of course, controlled by the selective switch 32.

The operation of the device is easily appreciated. As above stated, the motor shown, including rotor 8 and stator 9, is a variable speed motor and preferably has a constant power at least within certain limits (for instance, between 1000 and 3000 r.p.m.). Therefore, when the chuck head 4a is required to work, for instance, in the range of 1000 to 3000 r.p.m., the clutch is inserted for a direct coupling, leaving the clutch elements 20, 22 free so that the shaft of the chuck will be directly driven by the motor; when, on the contrary, the chuck is required to work under 1000 r.p.m., the reduction gears 15, 16, 18, 19 are inserted through the clutch elements 20, 22; the change of the ratio takes place not only without stopping the motor, but said motor, with the reduced ratio inserted, regains automatically the highest rotational speed.

The above stated gearing, device, being mounted and arranged differently from the usual arrangement, concentrically to the motor axle, allows a remarkable decrease of its size. In addition, the arrangement of the motor concentrically to the chuck shaft, besides reducing the size, eliminates the necessity for belts and other usually employed connecting members.

It is to be understood that the drawing only shows an embodiment given only as an illustration of the invention, said invention being adaptable to various forms and arrangements without however departing from the scope of the concept and principle of the invention.

It is to be noted that an arrangement as described above allows a high reduction of the inertia, owing to the absence of many rotating members having a high inertia, such as pulleys and gears. This also involves a reduced starting torque.

Another advantage is that the rotational speed may be modified during the work and without stopping the chuck, and in this way, it is possible to work at a constant cutting speed, modifying the number of revolutions without any traces being shown on the workpiece, owing to the stoppage.

What we claim is:

1. In a chuck construction for machine tools, in combination, a base, a pair of spaced coaxially disposed housings supported on said base, ball bearings in said housings, a rotary drive unit including an inner solid shaft journalled in said housings, a gear fixed adjacent one end of said inner shaft, a tubular driven member fixed to said gear, an outer tubular shaft sleeved over said inner shaft, a hollow cylindrical casing having end closure discs being mounted on said tubular shaft, a first one of said end closure discs having an extension, a device on the casing engageable with the base so as to prevent rotation of the casing, a variable speed electric motor including a stator and a rotor in said casing, the speed of said motor ranging from a predetermined maximum value to a predetermined minimum value, said stator being disposed on the inner surface of the cylindrical wall of the casing, said rotor being mounted on said tubular shaft, a gear loosely mounted on said tubular shaft, a tubular driven member fixed to said latter gear, driving mechanism interposed between said loose gear and said inner shaft, said mechanism also including a transmission shaft journalled at one end in said first one end disc and at its other end in the extension on said first one end disc, gears on the ends of said transmission shaft, a first one of said last-named gears meshing with the loose gear on the tubular shaft, the other of said gears meshing with the gear fixed on the inner shaft, a double electromagnetically operated clutch device surrounding said tubular shaft, said device including a core member underlapping said tubular driven members fixed on said tubular shaft, opposite windings on said core member, armature plates on the tubular shaft axially and selectively slidable under the influence of said windings, a series of rings supported on the inner and outer surfaces of said tubular driven members and on said core member, respectively, in juxtaposed relation, said rings being adapted to be moved by said armature plates into and out of frictional engagement with each other, the rings on one of said tubular driven members forming a direct coupling between the tubular shaft and the gear on the inner shaft, and the other rings forming a coupling between the tubular shaft and the loose gear on said tubular shaft.

2. In a chuck construction for machine tools, in combination, a base, a pair of spaced coaxially disposed housings supported on said base, ball bearings in said housings, a rotary drive unit including an inner solid shaft journalled in said ball bearing housings, a gear fixed adjacent one end of said inner shaft, a tubular driven member fixed to said gear, an outer tubular shaft sleeved over said inner shaft, a hollow cylindrical casing having end closure discs mounted on one end of said tubular shaft, a device on the casing engageable with the base so as to prevent rotation of the casing, a variable speed electric motor including a stator and a rotor in the casing, the speed of said motor ranging from a predetermined maximum value to a predetermined minimum value, the stator being disposed on the inner surface of the cylindrical wall of the casing, said rotor being mounted on said tubular shaft, a gear loosely mounted on said tubular shaft adjacent to and outwardly of the casing, a tubular driven member fixed on said loose gear and extending outwardly toward the tubular driven member on the fixed gear, driving mechanism interposed between the loose gear and the inner shaft, a double electro-magnetically operated clutch device surrounding said tubular shaft at the other end thereof, said device including a core member fixed to said tubular shaft and underlapping said tubular driven members, said tubular driven members being adapted to be alternately coupled to the said core member, one of said tubular driven members thereby constituting part of a direct drive from the inner shaft, and the other tubular driven member constituting the first element of a reduction gear drive connected to said inner shaft.

3. In a chuck construction for machine tools, in combination, a base, a pair of spaced coaxially disposed housings supported on said base, ball bearings in said housings, a rotary drive shaft unit including an inner solid shaft journalled in said ball bearing housings, a gear fixed adjacent one end of said inner shaft, a tubular driven member fixed to said gear, an outer tubular shaft sleeved over said inner shaft, a hollow cylindrical casing mounted on one end of said tubular shaft, a device on the casing engageable with the base so as to prevent rotation of the casing, a variable speed electric motor including a stator and a rotor in said casing, said stator being disposed on the inner surface of the cylindrical wall of the casing, said rotor being mounted on said tubular shaft, a gear loosely mounted on said tubular shaft adjacent to and outwardly of the casing, a tubular driven member fixed on said gear and extending outwardly toward the tubular driven member on the fixed gear, driving mechanism interposed between the loose gear and the inner shaft, a double electromagnetically operated clutch device surrounding said tubular shaft, said device including a core member fixed to said tubular shaft and underlapping said tubular device members, opposite windings on said core member, armature plates on the tubular shaft axially and selectively slidable under the influence of said windings, a series of rings supported on the inner and outer surfaces of said tubular driven members and on said core member, respectively, in juxtaposed relation, said rings being adapted to be moved by said armature plates into and out of frictional engagement with each other, the rings on one of said tubular driven members forming a direct coupling between the tubular shaft and the gear on the inner shaft, the other rings forming a coupling between the tubular shaft and the loose gear on the tubular shaft.

4. In a chuck construction, for machine tools, in combination, a base, a pair of spaced coaxially disposed housings supported on said base, ball bearings in said housings, a rotary drive unit including an inner solid shaft journalled in said ball bearing housings, a gear fixed adjacent one end of said inner shaft, a tubular driven member fixed to said fixed gear, an outer tubular shaft sleeved over said inner shaft, a hollow cylindrical casing mounted on one end of said tubular shaft, a device on the casing engageable with the base so as to prevent rotation of the casing, a variable speed electric motor including a stator and a rotor in the casing, said stator being disposed on the inner surface of the cylindrical wall of the casing, said rotor being mounted on said tubular shaft, a gear loosely mounted on said tubular shaft adjacent to and outwardly of the casing, driving mechanism interposed between the loose gear and the inner shaft, a double electromagnetically operated clutch device surrounding said tubular shaft at the other end thereof, said device including a core member fixed to said tubular shaft and underlapping said tubular driven members, said tubular driven members being adapted to be alternately coupled to the said core member, one of said tubular driven members constituting part of a direct drive from the inner shaft and the other tubular driven member constituting the first element of a reduction gear drive connected to said inner shaft.

5. In a chuck construction for machine tools, in combination a base, a pair of spaced coaxially disposed housings supported on said base, ball bearings in said housings, a rotary drive unit including an inner solid shaft journalled in said ball bearing housings, a gear fixed adjacent one end of said inner shaft, a tubular driven member fastened to said fixed gear, an outer tubular shaft sleeved over said inner shaft, a hollow cylindrical casing having end closure discs mounted on one end of said tubular shaft, one of said closure discs having an extension thereon, a device on the casing engageable with the base to prevent rotation of the casing, a variable speed electric motor including a stator and a rotor in the casing, the speed of the motor ranging from a maximum limit value to a minimum limit value, the stator being disposed on the inner surface of the cylindrical wall of the casing, the rotor being mounted on said tubular shaft, a gear loosely mounted on said tubular shaft adjacent to and outwardly of the casing, a tubular driven member fixed on said loose gear and extending outwardly toward the tubular driven member on the fixed gear, driving mechanism interposed between the loose gear and the inner shaft, said mechanism including a transmission shaft journalled at one end in said one end disc and at its other end journalled in the extension on said one end disc, other gears on the ends of said transmission shaft, one of said last-named gears meshing with the loose gear on the tubular shaft, the other of said last-named gears meshing with the gear fixed on the inner shaft, a double electro-magnetically operated clutch device surrounding said tubular shaft on the other end thereof, said device including a core member underlapping said tubular driven members fixed on said tubular shaft, said tubular driven members being adapted to be alternatively coupled to the said core member, one of said tubular driven members constituting part of a direct drive from the inner shaft and the other tubular driven member constituting the first element of a reduction gear drive connected to said inner shaft.

6. In a chuck construction, for machine tools, in combination, a base, a pair of spaced coaxially disposed housings supported on said base, ball bearings in said housings, a rotary drive unit including an inner solid shaft journalled in said ball bearing housings, a gear fixed adjacent one end of said inner shaft, a tubular driven member fixed to said gear, an outer tubular shaft sleeved over said inner shaft, a hollow cylindrical casing mounted on one end of said tubular shaft, a device on the casing engageable with the base to prevent rotation of the casing, a variable speed electric motor including a stator and a rotor in the casing, the speed of said motor ranging from a maximum limit value to a minimum limit value, said stator being disposed on the inner surface of the cylindrical wall of the casing, said rotor being mounted on said tubular shaft, a gear loosely mounted on said tubular shaft adjacent to and outwardly of the casing, driving mechanism interposed between the loose gear and the inner shaft, a double electromagnetically operated clutch device surrounding said tubular shaft at the other end thereof, said device including a core member fixed to said tubular shaft and underlapping said tubular driven members, said tubular driven members being adapted to be alternately coupled to the said core member, one of said tubular driven members constituting part of a direct drive from the inner shaft and the other tubular driven member constituting the first element of a reduction gear drive connected to said inner shaft.

References Cited in the file of this patent

UNITED STATES PATENTS

| Number | Name | Date |
| --- | --- | --- |
| 731,474 | Pontois | June 23, 1903 |
| 799,720 | Cutler | Sept. 19, 1905 |
| 1,170,738 | Cutler et al. | Feb. 8, 1916 |
| 1,394,125 | Stailey et al. | Oct. 18, 1921 |
| 1,442,217 | H'Doubler | Jan. 16, 1923 |